United States Patent
Sharif Askary et al.

(10) Patent No.: US 10,084,743 B2
(45) Date of Patent: Sep. 25, 2018

(54) METHODS AND SYSTEMS FOR ADAPTIVE AND CONTEXTUAL COLLABORATION IN A NETWORK

(71) Applicant: General Electric Company, Schenectady, NY (US)

(72) Inventors: Jamshid Sharif Askary, Melbourne, FL (US); Augusto Ramon Sellhorn, Melbourne, FL (US); Xiaofeng Wang, Melbourne, FL (US); Jay Tod Moser, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 187 days.

(21) Appl. No.: 14/687,472

(22) Filed: Apr. 15, 2015

(65) Prior Publication Data
US 2016/0308815 A1    Oct. 20, 2016

(51) Int. Cl.
*H04L 12/58* (2006.01)
*H04L 29/08* (2006.01)
*G06F 9/445* (2018.01)
*G06Q 10/10* (2012.01)

(52) U.S. Cl.
CPC ............ *H04L 51/32* (2013.01); *G06F 9/4451* (2013.01); *G06Q 10/10* (2013.01); *H04L 67/303* (2013.01)

(58) Field of Classification Search
CPC .............................. H04L 51/32; H04L 67/303
USPC ........ 709/203, 204, 205, 206, 207; 707/741, 707/748
See application file for complete search history.

(56) References Cited

U.S. PATENT DOCUMENTS

| | | | | |
|---|---|---|---|---|
| 4,864,501 A | * | 9/1989 | Kucera | G06F 17/274 704/8 |
| 6,714,975 B1 | | 3/2004 | Aggarwal et al. | |
| 2004/0162836 A1 | * | 8/2004 | Aronoff | H04L 29/06 |
| 2009/0150541 A1 | * | 6/2009 | Georgis | G06F 9/4443 709/224 |
| 2010/0318970 A1 | * | 12/2010 | Grechanik | G06F 11/3672 717/124 |
| 2013/0054509 A1 | * | 2/2013 | Kass | G06Q 10/00 706/55 |
| 2014/0089824 A1 | * | 3/2014 | George | G06F 8/38 715/762 |

OTHER PUBLICATIONS

"Sentence Parsing"—Gerard Kempen, University of Nijmegen, Jun. 1998 http://pubman.mpdl.mpg.de/pubman/item/escidoc:1082666/component/escidoc:1216597/Kempen_SentenceParsing_1998.pdf.*

European Search Report issued in connection with Corresponding EP Application No. 16164867.0 dated Jun. 28, 2016.

* cited by examiner

*Primary Examiner* — Randy Scott
(74) *Attorney, Agent, or Firm* — Parks IP Law LLC

(57) ABSTRACT

There is provided a system that includes a correlation module configured to receive input data from a device and generate a composite statement based on the input data and at least one of a condition of the system and domain model data. The system includes a decision module configured to generate recommendation data based on the composite statement. Further, the system includes a control module configured to engage an action at the device based on the recommendation data.

17 Claims, 7 Drawing Sheets

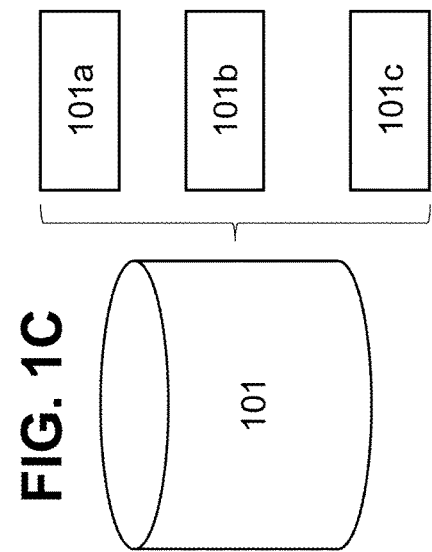
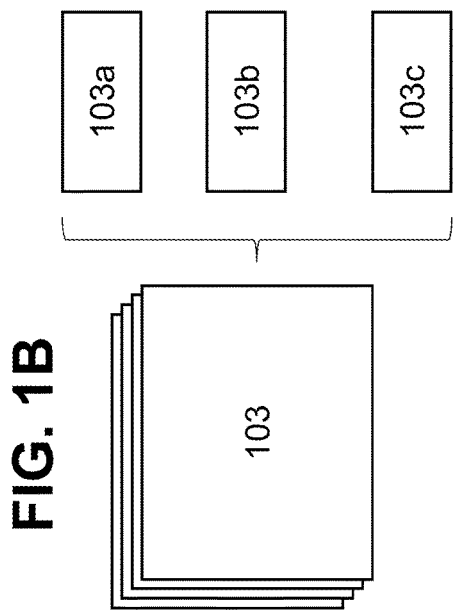

METHODS AND SYSTEMS FOR ADAPTIVE AND CONTEXTUAL COLLABORATION IN A NETWORK

TECHNICAL FIELD

The present disclosure relates to methods and systems for collaboration between users, applications, and devices in a network. More particularly, the present disclosure relates to adaptive, dynamic, and contextual collaboration between users, applications, and devices in a network.

BACKGROUND

In networks that include a wide variety of devices, each potentially running different types of applications, there is a need to provide adequate communication infrastructure that allows seamless interaction between each of the devices connected to the network. Such infrastructure may include network nodes that are configured to provide a common communication interface to devices that function according to different communication protocols.

With the advent of the Internet of Things (IoT), there is much effort devoted to providing systems and methods for facilitating communication between a disparate set of devices across a common network. For example, in the utilities industry, this is particularly important for novel Smart Grid networks that require the interfacing of smart meters, computers and servers at electricity production and distribution facilities, third-party electricity consumption-monitoring devices, data analytics servers for billing, and electricity grid monitoring devices and software.

While there are significant efforts being deployed towards facilitating communication between the very many devices and applications associated with Smart Grid networks, an area that is often neglected is the development of user interfaces that facilitate collaboration between entities across the network. For example, current systems do not offer users the capability of discovering functions or information that may be relevant during a current state of the system, especially when the needed capability is not deployed or part of the user interface (UI) workflow, which is typically statically defined.

Further, current systems cannot dynamically optimize user navigation based on user behavior, but instead, navigation is based on static definitions. Furthermore, current systems rely on manual feedback or user feedback from the field; feedback which is then used to conduct upgrades and/or patches. Lastly, current systems can only present to an operator static views of software modules and static views of their associated UIs. Current systems do not have the capability to dynamically generate and compile information from other systems to provide a cross-system overview of all related systems, operators, and users.

SUMMARY

The embodiments described herein help mitigate and/or solve the aforementioned issues, as well as other issues known in the art. The present disclosure features methods and systems for providing dynamic built-in collaboration capabilities between applications, devices and users in a network operational environment. For example, and not by limitation, such a network operational environment may be a Smart Grid network operational environment.

In one embodiment, there is provided a system that includes a correlation module configured to receive input data from a device and generate a composite statement based on the input data and at least one of a condition of the system and domain model data. The system can include a decision module configured to generate recommendation data based on the composite statement. Further, the system can include a control module configured to engage an action at the device based on the recommendation data.

In another embodiment, there is provided a method for execution by a system comprising a processor, where the system is configured to facilitate adaptive contextual visual collaboration. The method includes receiving, by the system, input data from a device and generating a composite statement based on the input data and at least one of a condition of the system and domain model data. The method can include generating, by the system, recommendation data based on the composite statement. Furthermore, the method can include engaging, by the system, an action at the device based on the recommendation data.

In yet another embodiment, there is provided a computer-readable storage device including instructions that, when executed by a processor, cause the processor to perform operations relating to facilitating adaptive and contextual visual collaboration in a network. The operations can include receiving input data from a device and generating a composite statement based on the input data and at least one of a condition of the system and domain model data. The operations can include generating recommendation data based on the composite data. Furthermore, the operations can include engaging an action at the device based on the recommendation data.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

FIG. 1B is an illustration of a domain model for use with the exemplary embodiments.

FIG. 1C is an illustration of a profile and history database for use with the exemplary embodiments.

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

The exemplary embodiments described herein allow a network operational environment to adapt to types of individuals based on their role, historical behavior and one or more real time system conditions, using adaptive and semantic machine learning-based algorithms. Embodiments of the present disclosure provide a more effective user experience (UX), the observation of a condition-based system of systems, real time situational awareness, and the ability to monitor the system or parts of the system with extended line of sight and faster response times.

The embodiments allow discoverability, i.e. they make relevant features more easily discoverable to users, by suggesting widgets, applications, analytics, that are more pertinent to the current state of the system, but that would otherwise be unknown to a user, or that may not be currently deployed or integrated into the user's system.

Further, the embodiments allow optimization that reduces the number of user inputs, i.e. the number of steps required to perform specific tasks, based on the roles and responsibilities of the user and their historical behavior. This has the advantage of optimizing user experience as well as reducing time and potential errors.

The embodiments also allow continuous performance evaluation of the system's user interface (e.g. number of clicks, user errors, etc.). They also allow the measuring and fine tuning the UI by adaptively and dynamically learning the behavior of users, their roles, and how individual users respond to current system conditions. Furthermore, the embodiments permit dynamically generated "system of systems" views and navigational links that proactively assist operators in utilizing cross-system UI capabilities, thus providing broader system context, situational awareness, and informed decision making.

Figure 1A:
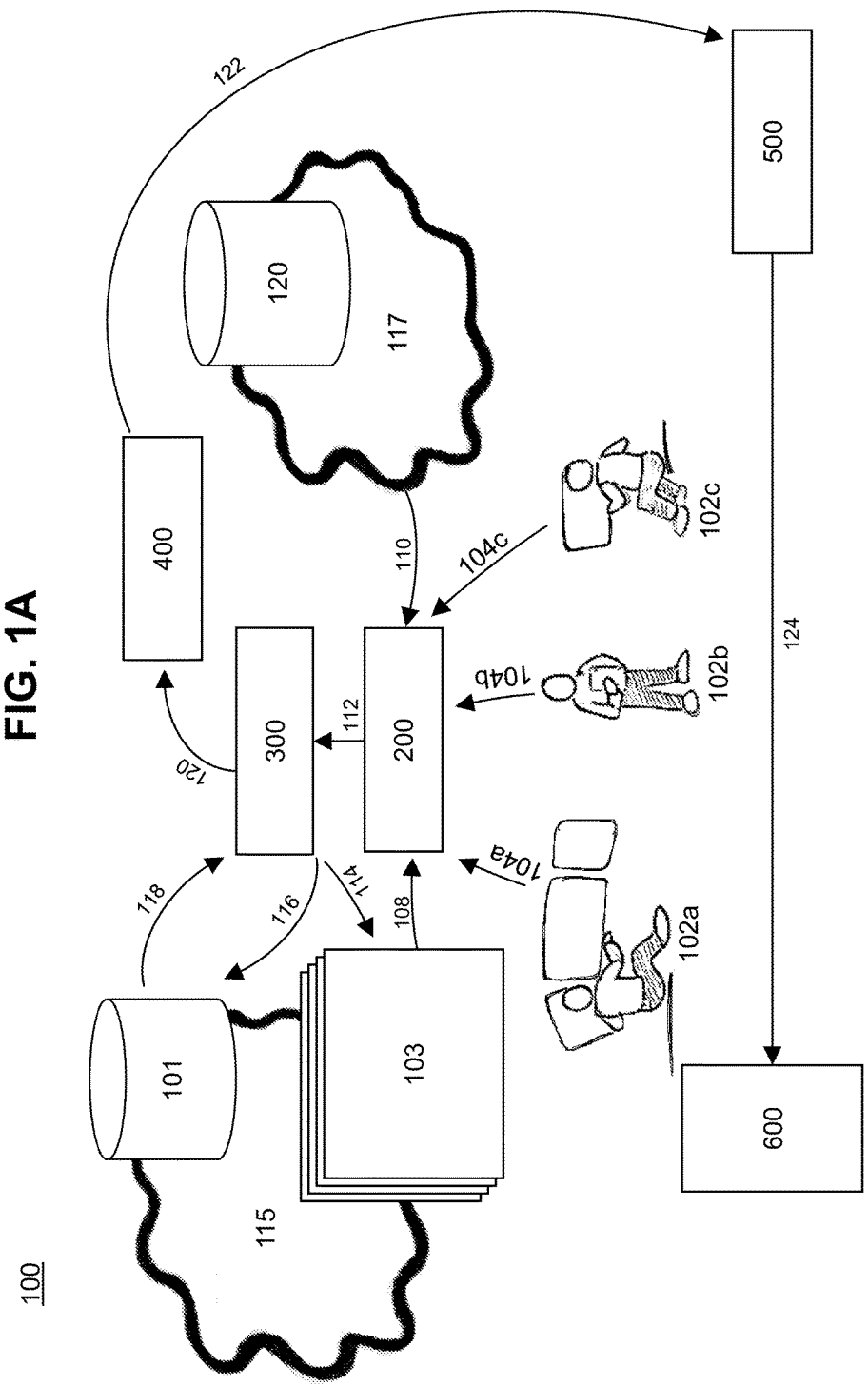
FIG. 1A is an illustration of a system, according to an exemplary embodiment.

FIG. 1A is an illustration of a system 100, according to an embodiment. System 100 can accommodate a plurality of users who use or monitor a wide variety of devices in a network 117. The devices run applications that are associated with the many functionalities provided by the devices across network 117. For example, network 117 may be a Smart Grid network, which can include smart-meters, high-voltage charging stations, grid monitoring devices, computers, servers, and the like.

In FIG. 1A, users 102a, 102b, and 102c exemplify a situation where each user has a specific role and interacts with devices of network 117 in a different manner. For example, user 102a can use a workstation located at an enterprise facility to monitor and/or effect changes to one or more devices in network 117. Similarly, user 102b, while in the field, can use a mobile computing platform, such as a tablet device, to monitor or configure devices in network 117. And user 102c can monitor and/or effect changes to the devices of network 117 using a workstation located at facility other than the enterprise facility.

In such a network, each of the users will have different roles and will thus be using different types of applications. Nevertheless, they may need to collaborate in real time, or at minimum, decisions made by one user at one point in time can later influence the work flow of other users in the system. System 100 is configured to provide a collaborative UX, in addition to the advantages noted above. Specifically, system 100 is configured to provide a user with a dynamic and a built-in collaboration framework utilizing an adaptive contextual visual collaboration approach.

System 100 includes a correlation module 200 (or correlation engine), which can take user inputs and semantically ascertain, from the user inputs, which type(s) of tasks is (are) being performed or requested. For example, when user 102a clicks on a button of a UI running on its workstation, the click is detected by correlation module 200 in the form of raw input 104a. Correlation module also receives data 108 from a domain model 103 and data 110 from network 117. Data 108 includes domain model information, as described below, and data 110 includes system information indicative of status and condition of devices and/or high level system information across network 117. Data 108 can be stored and fetched from a database 120 included in network 117.

Upon receiving data 108 and data 110, correlation module 200 associates raw input 104a with information from the domain model 103 to determine what type of action user 102a is expecting based on the click. Similarly, raw inputs 104b and 104c originate from the UIs of users 102b and 102c, respectively, and the raw inputs are mapped to information contained in domain model 103. It is noted that while raw inputs are described as resulting from clicks, generally speaking, any action undertaken by a user via the UI can be inputted to correlation module 200 as a raw input.

Domain model 103 is located in a data lake 115, which may be within network 117, although shown separately in FIG. 1A. Domain model 103 can be dynamically updated as system 100 is being used, as shall be seen below. As shown in FIG. 1B, domain model 103 includes information relating to assets and services 103a, users and user roles 103b, UX and UI ontology definitions and instances 103c. Furthermore, domain model 103 includes definitions of domain UI components, which are instanced with a catalog of all UI applications that are deployed, un-deployed, and/or applicable. Domain model 103 can also include third-party and customer UI applications that may be used in system 100. Moreover, domain model 103 can also include definitions of assets and services available in network 117, instances of network models as well as assets and services related to those instances.

System 100 also includes a learning module 300 (or learning/decision engine) that receives data 112 from correlation module 200. Data 112 is a composite statement that results from the semantic association of raw inputs 104a, 104b, and 104c with data 108, and data 110. One of skill in the art will readily appreciate data 112 can be the result of associating raw inputs from one or more users with one of data 108 and data 110 or with both of data 108 and data 110. In sum, learning module 200 is configured to determine what a user wishes to achieve based on all the necessary context information included in data 112.

Furthermore, learning module 300 is configured to update domain model 103 by dynamically enriching information in domain model 103 with metadata 114. Learning module 300 is also configured to fetch information (data 118) and update (data 116) a profile and history database 101. As shown in FIG. 1B, profile and history database 101 includes logs of users 101a, logs of roles 101b, and community information 101c, i.e. global information relating to groups of users of system 200. Lastly, based on at least one of data 118 and data 112, learning module 300 is configured to generate data 120 to a user interface (UI) control module 400.

Data 120 can be information that triggers UI control module 400 to issue a recommendation 122 to a user of system 100. Recommendation 122 can be one of a view, a layout, a navigational context, an application, and one or more collaboration suggestions to one of users 102a, 102b, and 102c. Generally speaking, however, recommendation 122 can be any suggestion presented to a user that modifies the user's UI and/or UX. As such, recommendation 122 is generated based on semantic correlations achieved by correlation module 200 and information obtained from of learning module 300. Recommendation 122 is fed to a user's device that includes UI control agent 500 that integrates recommendation 122 into UI 600 to provide adaptive and visual context capability.

Figure 2:
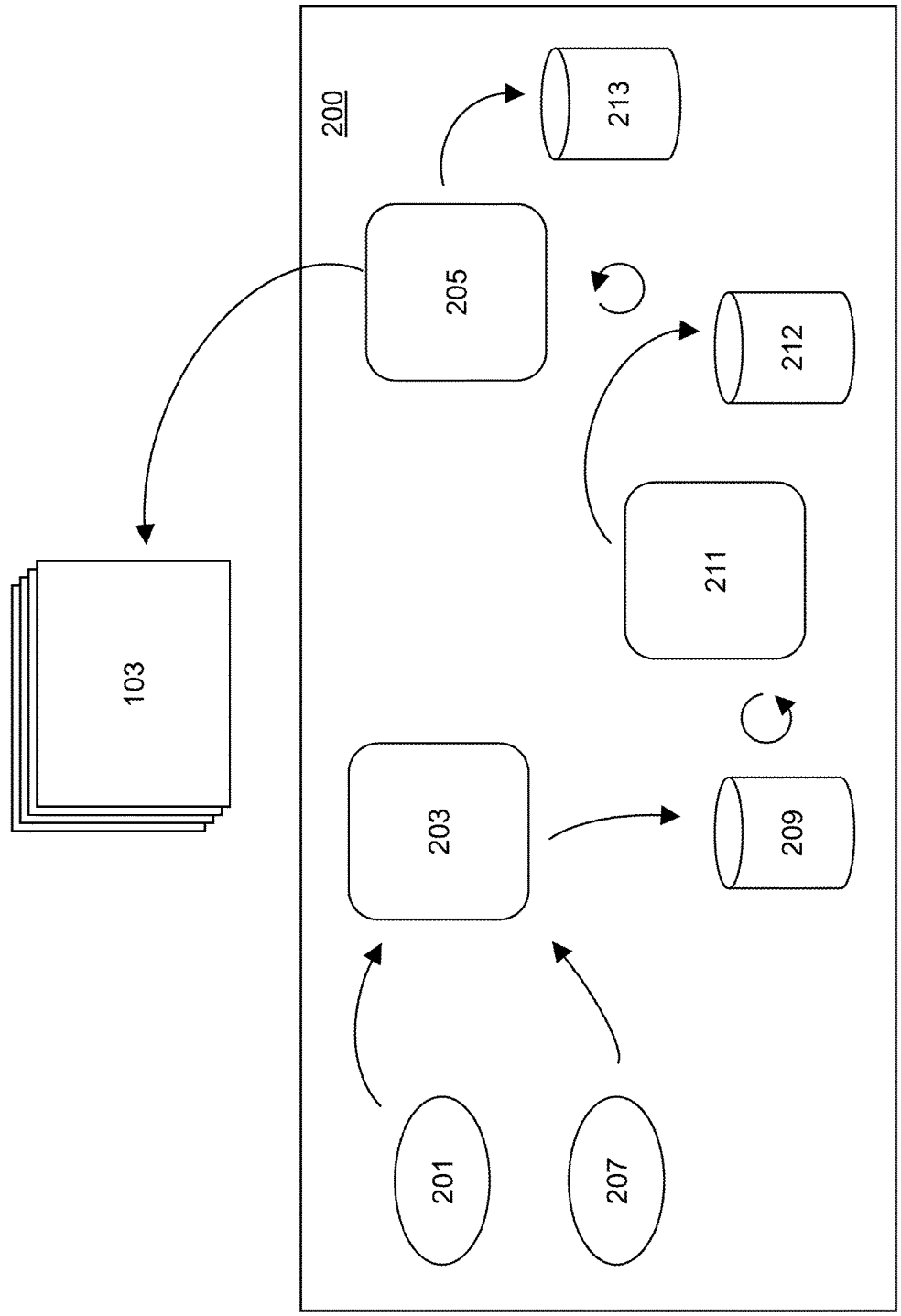
FIG. 2 is an illustration of a correlation module, according to an exemplary embodiment.

FIG. 2 is an illustration of correlation engine 200. Correlation engine 200 includes an input collector 203 that is configured to collect raw inputs 201 and system conditions 207. Raw inputs 201 and system conditions 207 are saved in repository 209 for later use. Correlation engine 200 also includes an interpreter 211 which fetches data from repository 209. Interpreter 211 generates, based on the data obtained from repository 209, single semantic statements relating to what a user is doing or what the current system conditions are. These results are saved in another repository 212. Correlation engine 200 further includes an inference module 205 configured to fetch a single semantic statement from repository 209 and generate, based on domain semantic models from domain model 103, correlated semantic statements that are then stored in composite statement repository 213. It is noted that inference module 205 is also configured to enrich domain model 103 based on the single semantic statements from repository 209. The composite statements generated by inference module 205 are then fed to learning module 300 whose structure is described below.

Figure 3:
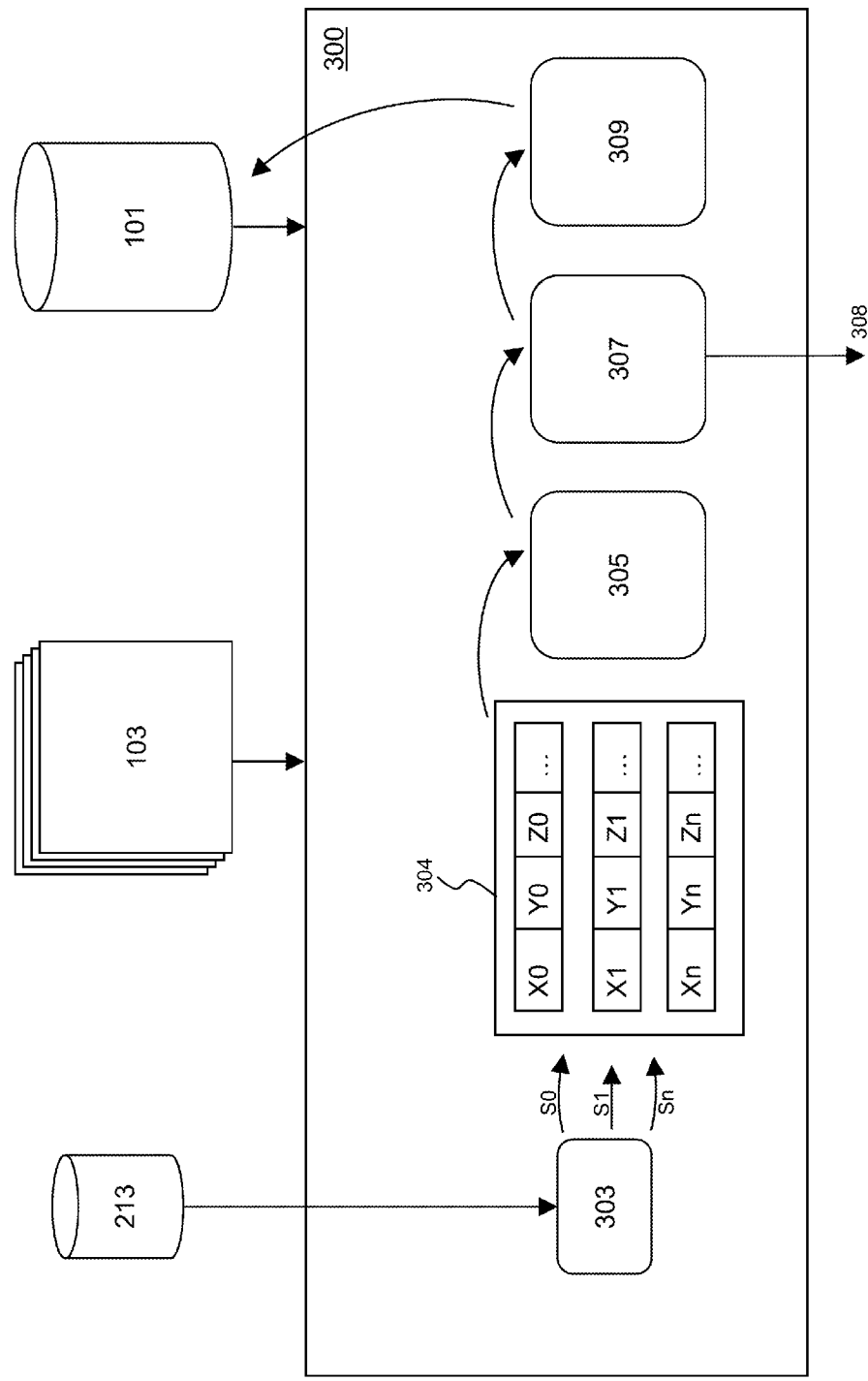
FIG. 3 is an illustration of a learning or decision module, according to an exemplary embodiment.

As shown in FIG. 3, learning module 300 interfaces with composite statement repository 213, domain model 103, and profile and history database 101. Learning module 300 includes an input processor 303 that is configured to fetch or receive composite statements from correlation module 200 via repository 213 (see data 112 in FIG. 1A).

Input processor 303 is configured to identify state variables from the composite statements received from repository 213. The identification process includes interpreting the composite statements and dynamically identifying state variables relating to "who," "what," "types of actions,", and "where." These state variables are later on used to calculate objective functions, as shall be explained below.

Input processor 303 is configured to output states S0, S1 . . . Sn, wherein n can be an integer greater than 1. These states are tabulated as shown in data structure 304, which is obtained from parsing the composite statements of repository 213. By example only, and not by limitation, FIG. 3 shows an exemplary tabulation of the state variables (i.e. data structure 304) determined by input processor 303.

Data structure 304 includes a plurality of classes, of which only three are shown for simplicity (X, Y, and Z). Each class is associated has data associated with a specific state variable column-wise. For example, class X includes X0, which is associated with S0, X1 associated with S1, and generally speaking, Xn being associated with state Sn. Similarly, classes Y and Z and the other classes of data structure 304 (not shown) may each include entries associated with the state variables identified by input processor 303. Entries in data structure 304 can be of the form Xn (persona)=[users, system, applications, . . . ], Yn (asset)=[asset1, asset2, asset3, . . . ], and Zn(action)=[operation, UI control, . . . ]. In other words, entries in class X correspond to personas, i.e. they are associated with users, the identities and roles in the systems, and the applications they typically use. Entries in class Yn can be associated with assets available to the personas in entries Xn, and entries in class Zn can be associated with the actions associated with users and assets from entries Xn and Yn.

The classes can be used to compute and minimize objective functions in order to adaptively facilitate the user's experience. This is done using objective function processor 305 and the output from the state variable identification process. Objective function processor 305 dynamically establishes objective functions based on what users are trying to achieve with the current system condition. Objective function processor 305 computes the optimum number of actions of Y's and required collaboration of X's where Y is also used to compute f(X, Y, Z), f being the objective function and X being representative of collaborations in user communities in relation to users in Z that conform to their respective roles.

Objective functions f are then fed to an optimization module 307 that is configured to solve the objective functions with the results of the UI actions and coordination for the involved users. One output, i.e. recommendation 308 of optimization module 307 is then fed to a UI control module 400, and another output is fed to a learning core 309, which is configured to take feedback from the users and maintain the behavior history and profile of the users, which can later be used for additional optimization. The output of learning core 309 is fed to profile and history database 101.

Figure 4:
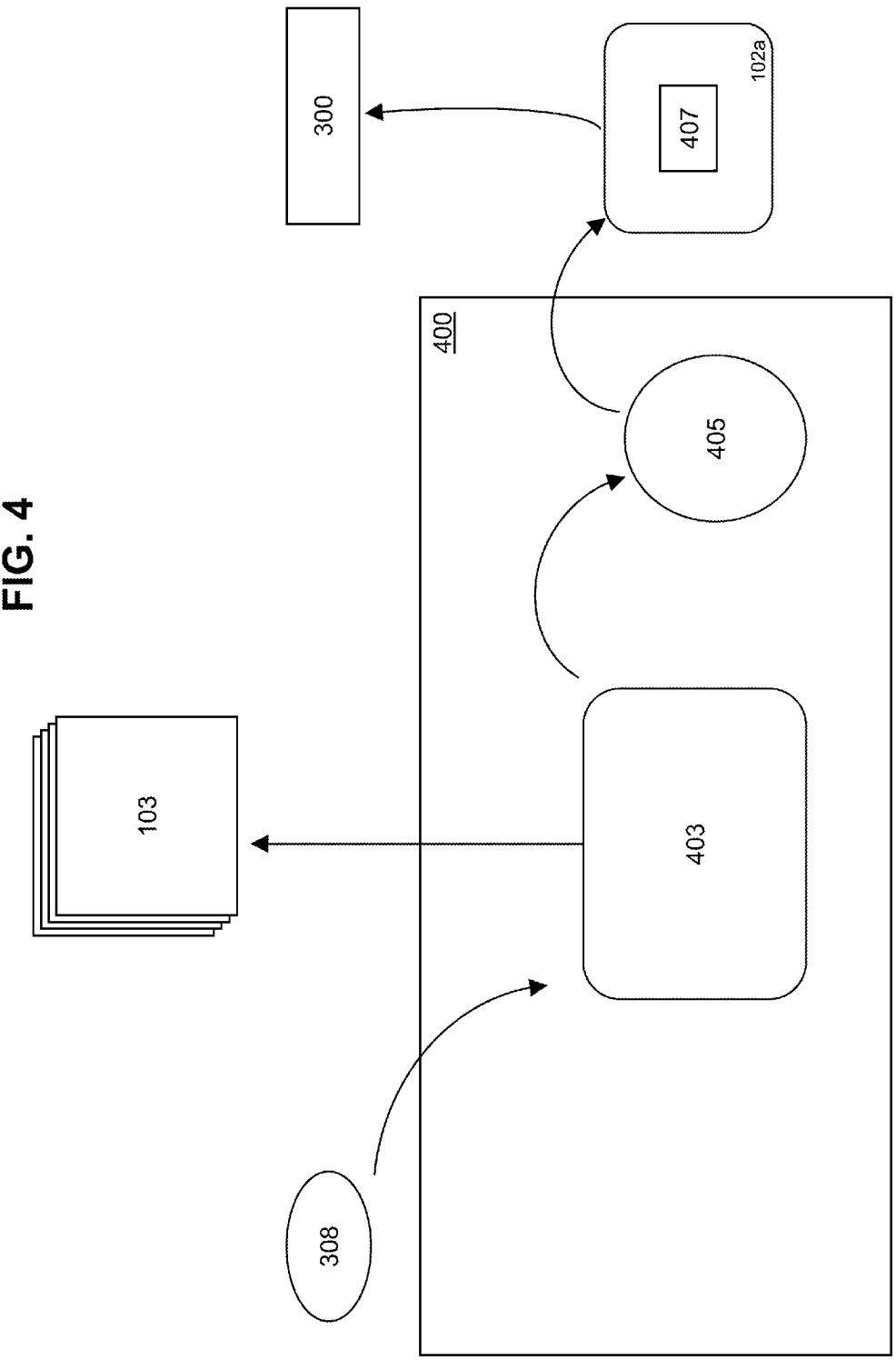
FIG. 4 is an illustration of a control module, according to an exemplary embodiment.

FIG. 4 is an illustration of the structure of UI control module 400. It includes a UI generator configured 403 to receive recommendation 308 from learning module 300. UI generator 403 is configured to parse recommendation 308 to look for recommended actions and traverse the UI model, looking for matching screens, applications, analytics, and controls of corresponding categories, personas, and data items. UI generator 403 factors in applications that the users are currently running as well as applications that are not in the system but can be recommended. UI generator 403 also updates domain model 103 for future adaptation and contextual visualization. The output of UI generator 403 is then fed to a UI event broadcaster 405.

UI event broadcaster 405 holds UI events that are fetched from UI agents 407 in their listener modules. UI event broadcaster 405 is also configured to broadcast recommendation 308 to UI agents 407. It is noted that UI agents 407 are software modules located on the input devices used by the users. For clarity, in FIG. 4 (and FIG. 5), the user device is labeled 102a to indicate the device used by user 102a in FIG. 1. UI control module 400 module is further configured to update learning module 300 based on how users react to receiving recommendation 308.

Figure 5:
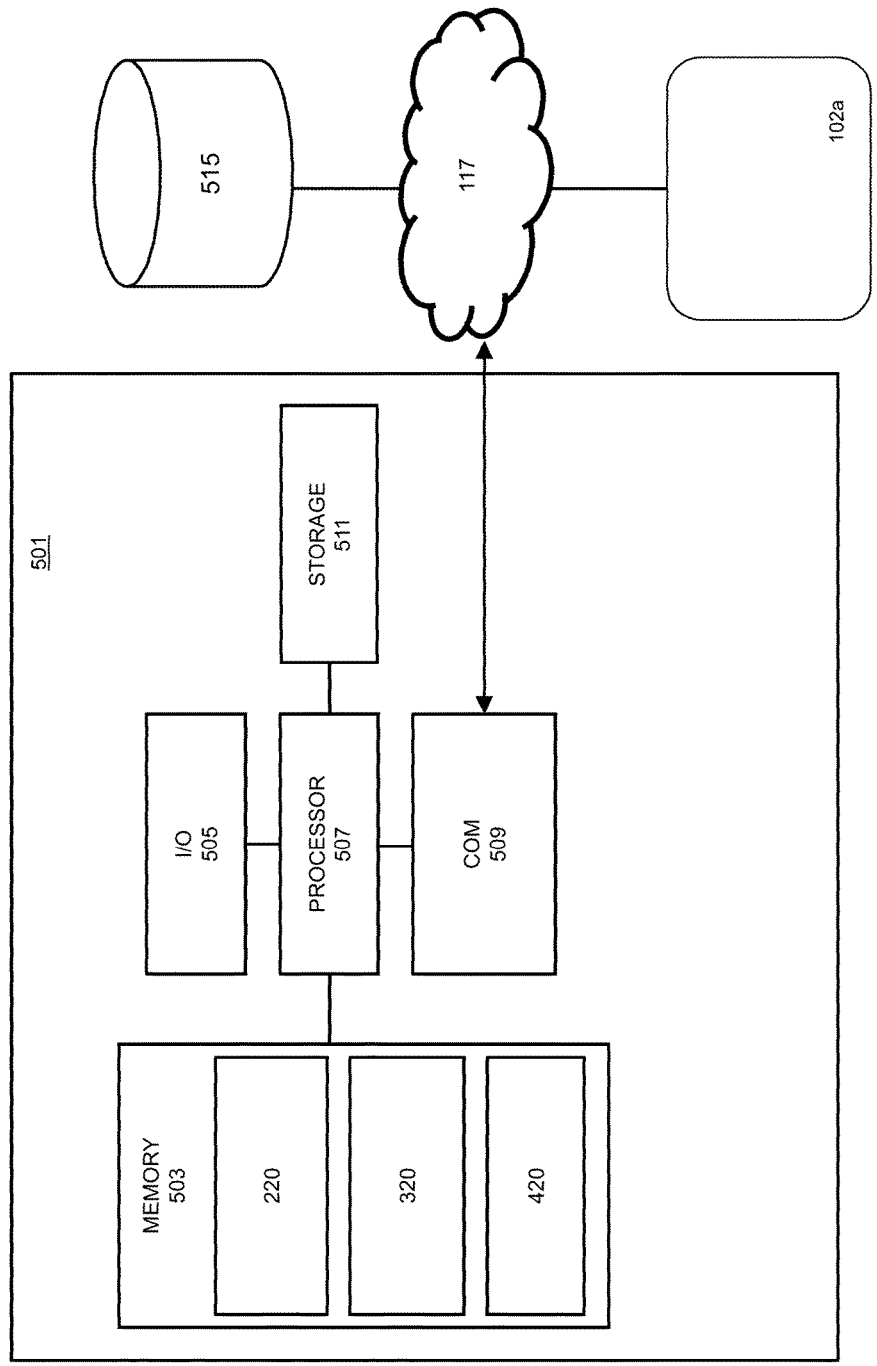
FIG. 5 is an illustration of a system, according to an exemplary embodiment.

FIG. 5 is in an illustration of another system 501 according to an embodiment. System 501 can perform all the functions described above with respect to system 100 and of its constituent modules. These functions can be programmed in software and/or firmware that can be loaded onto a computer-readable medium which can be read by system 501 to cause system 501 to execute one or more or all of the functions. System 501 includes a processing unit 507 coupled to a memory 503. The memory 503 can have instructions stored thereon, the instructions being configured to cause the processing unit 507 to execute the various functions described above with respect to system 100.

System 501 can include one or more hardware and/or software (or firmware) components configured to fetch, decode, execute, store, analyze, distribute, evaluate, and/or categorize information relating to the various functions and applications discussed herein. In some embodiments, the entirety of system 501 may be located in one location of network 117. In other embodiments, some components of system 501 may be distributed across network 117, without departing from the functionality of system 501.

Processing unit 507 can include one or more processors configured to execute instructions that impart to system 501 the functionalities described throughout the present disclosure. Furthermore, system 501 can include a storage device 511, an input/output (I/O) module 505, and a communication network interface 509. System 501 can be connected to network 117 via network interface 509. As such, system 501 can be communicatively coupled to one or more databases, such as domain model 103 and profile and history database 101. For clarity, these databases are shown as one database 515.

System 501 can be configured to function as a client device that is communicatively coupled to a server (not shown) via network 117. The server may be located at one data center, or distributed over a plurality of data centers. In some embodiments, system 501 can include an I/O module 505, which can allow an operator to monitor and/or configure the operations of system 501.

Processing unit 507 can be configured to execute software or firmware instructions, routines, or sub-routines that are designed to cause processing unit 507 to perform a variety of functions and/or operations consistent with the embodiments of the present disclosure. In one exemplary embodiment, instructions can be loaded into the various modules of memory 503 for execution by processing unit 507. Instructions can also be fetched by processing unit 507 from database 519, storage device 515, which may be a computer-readable medium having the instructions stored thereon. The instructions can then be stored in memory 503. Alternatively, the instructions may be provided directly from I/O module 505 and stored in memory 503 for later executions, or they may be executed directly by processing unit 507.

Memory 503 can include correlation module 220, learning module 320, and UI control module 420, which when executed by processor 507, impart the functionalities of correlation module 200, learning module 300, and UI control module 400 on system 501, respectively.

Storage device 515 can include a volatile or non-volatile, magnetic, semiconductor, tape, optical, removable, non-removable, read-only, random-access, or other type of storage device or computer-readable computer medium. Furthermore, storage 515 can be configured to log data processed, recorded, or collected during the operation of system 501. The data can be time-stamped, cataloged, indexed, or organized in a variety of ways consistent with data storage practice without departing from the scope of the present disclosure.

Communication network interface 509 includes one or more components configured to transmit and receive data via communication network 117. These components can include one or more modulators, demodulators, multiplexers, de-multiplexers, network communication devices, wireless devices, antennas, modems, and any other type of device configured to enable data communication via any suitable communication network. Furthermore, communication network 117 can be any appropriate network allowing communication between or among one or more computing systems, such as the Internet, a local area network, a wide area network, or a Smart Grid network. User input devices (shown has 102a in FIG. 5) can interface via network 117 with system 501 and can benefit from adaptive and contextual visualization as explained above.

Having set forth the structure and functions of system 100 and 501 and their various constituent modules as well as their specific functions and operations, methods consistent with embodiments of the present disclosure are now described. Such methods can include all of the operations described above in the context of system 100 and 501.

Figure 6:
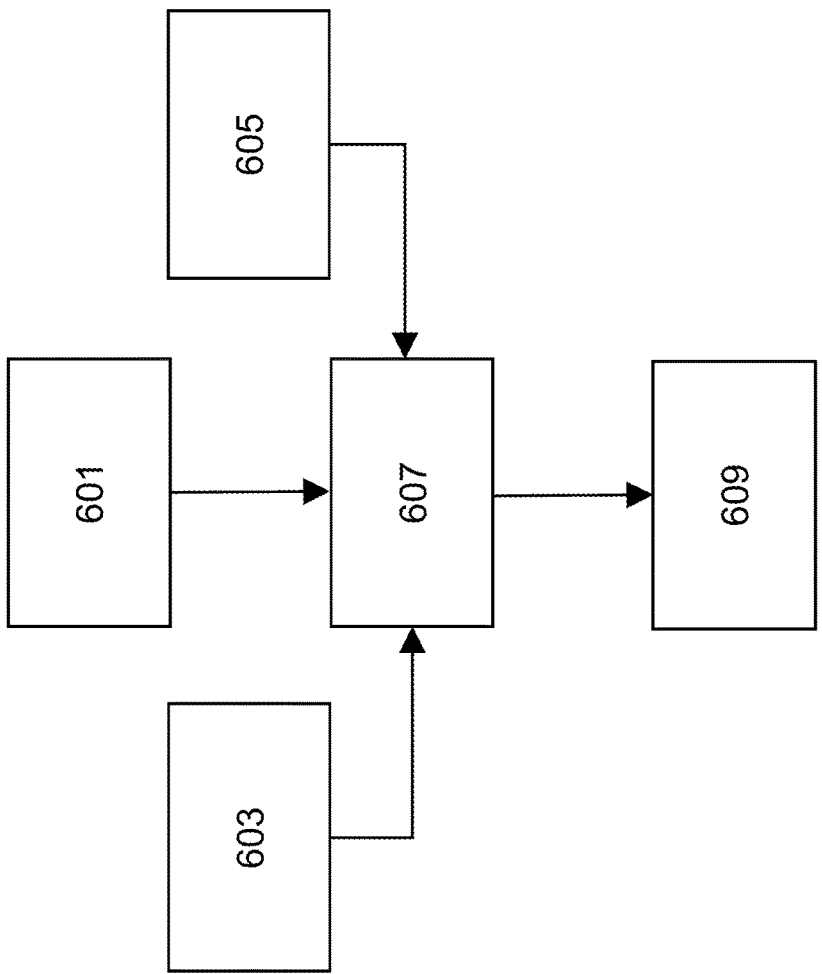
FIG. 6 is flow chart depicting a method, according to an exemplary embodiment.

FIG. 6 is a flow chart of such an exemplary method 600. Method 600 includes receiving input data (step 601) from a device (such as an input device from user 102a). Method 600 can further include generating a composite statement (step 603) based on the input data and at least one of a condition of the system (605) and domain model data (607). Method 601 can further include generating (step 609) recommendation data based on the composite statement.

Exemplary methods can further provide adaptive contextual role-based UX and visual collaboration with built-in machine learning capabilities that adapt to types of individuals based on their roles, historical behavior and real time system conditions. Exemplary methods may include providing dynamic, situational and condition-based points of view via context ascertained from built-in correlation and semantic algorithms. They may also include providing visual collaboration with upward and horizontal inheritance, thus enabling learning from other users in real time or in "study mode." Exemplary methods can also provide model-driven UX design system, thus enabling extensibility and elasticity.

Furthermore, exemplary methods according to the teachings presented herein can provide built-in contextual optimization with scenario-based contingency analysis with machine learning capability, which enables operators to adjust and optimize their point of view for awareness, monitoring, and for fast response time and productivity. These features are especially advantageous for mission critical applications, both in real time and "study mode," in Smart Grid network operational environments.

Exemplary methods may further provide the ability to derive the context of visual components as well as their semantic behaviors, downward to child-applications and visual containers, while providing dynamic mashup capability. Furthermore, exemplary methods can provide the ability to translate and record navigational actions, gestures, and interactions with UI controls into semantic statements that can describe, at runtime or later, the intent of the user based on the context and the status of the system.

In sum, methods and systems according to the embodiments presented herein offer a wide variety of advantages that are inexistent in the related relevant art(s). For example, unlike the present embodiments, typical adaptive user interfaces do not take into account the semantics of a model in a particular domain in relationship to user role, history and state of the system. The embodiments allow dynamically and proactively adapting a UI based on domain information. For example, embodiments of the present disclosure are advantageous for the electric industry because they can leverage well-understood standards based on semantics, user roles and behaviors, historical patterns and system conditions.

Furthermore, the exemplary methods and systems yield solution offerings that have an integrated and dynamically adaptable operational view, compared to currently existing systems that are more statically defined and incapable of seamless UI integration. The exemplary systems and methods allow discoverability of features that may not be currently deployed, by suggesting and providing navigation to existing capabilities (analytics, applications), in addition to currently deployed capabilities. Yet another advantage of the teachings disclosed herein is a dynamic and adaptable model-driven UX design modality that will reduce the cost of user interface implementation and deployment while providing insights into which features are more relevant and in what context they are relevant to users.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A system, comprising:
    a processor; and
    a memory comprising instructions that, when executed by the processor, cause the processor to perform operations, comprising:
        generating, based on input data and system condition data, a plurality of semantic statements, wherein the input data is input by a user to a user interface of a device and the system condition data includes at least one of a system event, an alarm, and a state of the system;
        generating, based on at least one of the plurality of semantic statements and domain model data, a composite statement, wherein the domain model data includes at least one of assets, services, users, and roles;
        identifying, by parsing the composite statement, a plurality of state variables;
        determining an objective function, wherein the objective function is a function of the state variables;
        generating, by evaluating the objective function with values of the state variables, values of an output of the objective function;
        determining an optimized output of the objective function from the values of the output of the objective function, the optimized output being a minimum or maximum value, the optimized output being associated with an optimized set of values of the values of the state variables that determined the optimized output, the optimized set of values including at least one optimized value of at least one state variable; and
        generating, based on the optimized set of values, recommendation data, wherein the recommendation data includes an action for at least one user interface.

2. The system of claim 1, the memory comprising instructions that, when executed by the processor, cause the processor to perform operations, comprising generating one of profile data and historical data associated with the input data.

3. The system of claim 2, the memory comprising instructions that, when executed by the processor, cause the processor to perform operations, comprising generating the recommendation data based on at least one of the profile data and the historical data.

4. The system of claim 1, the memory comprising instructions that, when executed by the processor, cause the processor to perform operations, comprising generating the domain model data.

5. The system of claim 4, the memory comprising instructions that, when executed by the processor, cause the processor to perform operations, comprising generating the domain model data by dynamically updating a model database with metadata.

6. The system of claim 1, wherein the action includes effecting a change in the at least one user interface.

7. The system of claim 6, wherein the change is effected by dynamically changing the user interface.

8. The system of claim 1, wherein the action comprises displaying at least one of a widget, a layout, a navigation option, a context option, and a collaboration option.

9. The system of claim 1, wherein the composite statement includes correlated ones of the plurality of semantic statements.

10. The system of claim 1, wherein each of the plurality of state variables includes entries in a plurality of classes, the classes including at least one of persona, asset, and action.

11. The system of claim 1, wherein the objective function represents what users are trying to achieve with the input data in response to the system condition data.

12. The system of claim 1, wherein the objective function is evaluated using the input data.

13. The system of claim 1, wherein the recommendation data is integrated into a user interface by parsing the recommendation data to look for recommended actions.

14. The system of claim 1, wherein the recommendation data is integrated into a user interface by traversing a model of the user interface to look for at least one of matching screens, applications, analytics, and controls of corresponding categories, personas, and data items.

15. The system of claim 1, wherein the recommendation data includes a plurality of actions corresponding to a plurality of user interfaces.

16. The system of claim 15, wherein the plurality of actions coordinate collaboration by the plurality of user interfaces to perform a task.

17. The system of claim 1, wherein the input data is input by a plurality of users to respective user interfaces of respective devices.

* * * * *